(12) United States Patent
Farine et al.

(10) Patent No.: US 9,872,521 B2
(45) Date of Patent: Jan. 23, 2018

(54) DEVICE AND METHOD FOR CONTROLLING AN ELECTRICAL HEATER TO LIMIT TEMPERATURE

(71) Applicant: Philip Morris Products S.A., Neuchatel (CH)

(72) Inventors: Robin Farine, Auvernier (CH); Pascal Talon, Thonon-les Baines (FR)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/219,011

(22) Filed: Jul. 25, 2016

(65) Prior Publication Data

US 2016/0331038 A1 Nov. 17, 2016

Related U.S. Application Data

(62) Division of application No. 14/427,093, filed as application No. PCT/EP2013/068722 on Sep. 10, 2013, now Pat. No. 9,713,345.

(30) Foreign Application Priority Data

Sep. 11, 2012 (EP) ..................... 12183837

(51) Int. Cl.
*H05B 1/02* (2006.01)
*A24F 47/00* (2006.01)
*G05D 23/19* (2006.01)

(52) U.S. Cl.
CPC ....... *A24F 47/008* (2013.01); *G05D 23/1917* (2013.01); *G05D 23/1919* (2013.01); *H05B 1/0225* (2013.01); *H05B 1/0244* (2013.01)

(58) Field of Classification Search
CPC .............. A24F 47/998; G05D 23/1967; H05B 1/0244; H05B 1/0225
(Continued)

(56) References Cited

U.S. PATENT DOCUMENTS

| 4,947,874 A | 8/1990 | Brooks et al. |
| 6,040,560 A * | 3/2000 | Fleischhauer ......... A24F 47/008 128/202.21 |

(Continued)

FOREIGN PATENT DOCUMENTS

| CA | 2 084 229 A1 | 3/1994 |
| CA | 2 391 688 A1 | 10/2003 |

(Continued)

OTHER PUBLICATIONS

Communication Relating to the Results of the Partial International Search dated Dec. 15, 2014 in PCT/EP2013/068722 filed Sep. 10, 2013.

(Continued)

*Primary Examiner* — Mark Paschall
(74) *Attorney, Agent, or Firm* — Oblon, McClelland, Maier & Neustadt, L.L.P.

(57) ABSTRACT

There is provided a method of controlling an electrical heating element, including maintaining a temperature of the heating element at a target temperature by supplying pulses of electrical current to the heating element; monitoring a duty cycle of the pulses of electrical current; and determining if the duty cycle differs from an expected duty cycle or range of duty cycles, and if so, reducing the target temperature, or stopping the supply of current to the heating element or limiting the duty cycle of the pulses of electrical current supplied to the heating element. As the temperature is maintained at a known target temperature, any variation in the duty cycle or range of duty cycles expected to maintain the target temperature is indicative of abnormal conditions.

10 Claims, 5 Drawing Sheets

(58) Field of Classification Search
USPC .................................. 219/492, 483, 497, 494
See application file for complete search history.

(56) References Cited

U.S. PATENT DOCUMENTS

| | | | |
|---|---|---|---|
| 6,833,535 | B2 | 12/2004 | Streit |
| 6,870,142 | B2 | 3/2005 | Hada |
| 6,968,842 | B1 | 11/2005 | Truschel |
| 7,167,776 | B2 | 1/2007 | Maharajh |
| 7,400,942 | B2 | 7/2008 | Cheng |
| 7,928,345 | B2 * | 4/2011 | Briggs .............. B32B 17/10174 219/203 |
| 9,498,000 | B2 * | 11/2016 | Kuczaj .................. A24F 47/008 |
| 2004/0060923 | A1 * | 4/2004 | Mathews, Jr. ......... H05B 3/746 219/492 |
| 2008/0092912 | A1 | 4/2008 | Robinson et al. |
| 2009/0133691 | A1 | 5/2009 | Yamada |
| 2010/0200006 | A1 | 8/2010 | Robinson et al. |
| 2012/0060853 | A1 | 3/2012 | Robinson et al. |
| 2013/0164191 | A1 | 6/2013 | Coursey |
| 2013/0233170 | A1 | 9/2013 | Spiegelman |
| 2013/0306084 | A1 | 11/2013 | Flick |

FOREIGN PATENT DOCUMENTS

| | | |
|---|---|---|
| CN | 1481525 A | 3/2004 |
| CN | 101862038 A | 10/2010 |
| CN | 101883596 A | 11/2010 |
| CN | 101977522 A | 2/2011 |
| CN | 102081416 A | 6/2011 |
| CN | 102595943 A | 7/2012 |
| EP | 0 358 002 A2 | 3/1990 |
| EP | 2 468 118 A1 | 6/2012 |
| JP | 2-124082 A | 5/1990 |
| JP | 2001502542 | 2/2001 |
| JP | 2010-506594 A | 3/2010 |
| KR | 10-0838859 B1 | 6/2008 |
| KR | 10-2010-0127817 A | 12/2010 |
| KR | 10-2010-0135865 A | 12/2010 |
| WO | WO 02/051468 A2 | 7/2002 |
| WO | WO 2008/108889 A1 | 9/2008 |
| WO | WO 2009/118085 A1 | 10/2009 |
| WO | WO 2009/132793 A1 | 11/2009 |
| WO | WO 2012/072790 A1 | 6/2012 |
| WO | WO 2012/085205 | 6/2012 |

OTHER PUBLICATIONS

Office Action dated Dec. 10, 2015 in Korean Patent Application No. 10-2015-7008464.
International Preliminary Report on Patentability and Written Opinion dated Mar. 26, 2015 in PCT/EP2013/068722.
English translation of Office Action dated Feb. 15, 2016 in Japanese Patent Application No. 2015-223869.
English Translation of Office Action dated Feb. 10, 2016 in Japanese Patent Application No. 2015-531539.
Korean Notice of Allowance with partial English translation dated Jun. 20, 2016 in corresponding Korean Application No. 10-2016-7000339, citing documents AO and AP therein. (3 pages).
English translation only of combined Chinese Office Action and Search Report dated Jun. 14, 2016 in corresponding Application No. 201380047266.5, citing documents AQ-AS therein. (6 pages).
English translation of "Notification of the First Office Action" dated Mar. 15, 2017 in counterpart Chinese Application No. 201510908619.7, 7 pages, citing documents AO through AS therein.

* cited by examiner

DEVICE AND METHOD FOR CONTROLLING AN ELECTRICAL HEATER TO LIMIT TEMPERATURE

CROSS-REFERENCE TO RELATED APPLICATION

This application is a divisional application of and claims the benefit of priority under 35 U.S.C. §120 to pending U.S. application Ser. No. 14/427,093, filed Mar. 10, 2015, which is a U.S. national phase application under 35 U.S.C. §371 of PCT/EP2013/068722, filed Sep. 10, 2013, and claims benefit of priority under 35 U.S.C. §119 from prior EP 12183837.9, filed Sep. 11, 2012, the entire contents of each of which are incorporated herein by reference.

The present specification relates to an electrical heater and a method and device for controlling the heater to avoid spikes in temperature. The specification relates more particularly to an electrical heater configured to heat an aerosol-forming substrate and a method and device for avoiding undesirable combustion of the aerosol-forming substrate. The described device and method is particularly applicable to electrically heated smoking devices.

Traditional cigarettes deliver smoke as a result of combustion of the tobacco and the wrapper which occurs at temperatures which may exceed 800 degrees Celsius during a puff. At these temperatures, the tobacco is thermally degraded by pyrolysis and combustion. The heat of combustion releases and generates various gaseous combustion products and distillates from the tobacco. The products are drawn through the cigarette and cool and condense to form a smoke containing the tastes and aromas associated with smoking. At combustion temperatures, not only tastes and aromas are generated but also a number of undesirable compounds.

Electrically heated smoking devices are known, which operate at lower temperatures. By heating at lower temperature, the aerosol-forming substrate (which in case of a smoking device is tobacco based) is not combusted and far fewer undesirable compounds are generated.

It is desirable in such electrically heated smoking devices, and in other electrically heated aerosol generating devices, to ensure as far as possible that combustion of the substrate does not occur, even in extreme environmental conditions and under extreme usage patterns. It is therefore desirable to control the temperature of the heating element or elements in the device to reduce the risk of combustion while still heating to a sufficient temperature to ensure a desirable aerosol. It is also desirable to be able to detect or predict combustion of the substrate and control the heating element accordingly.

In one aspect of the present disclosure, there is provided a method of controlling an electrical heating element, comprising:

maintaining the temperature of the heating element at a target temperature by supplying pulses of electrical current to the heating element;

monitoring the duty cycle of the pulses of electrical current; and determining if the duty cycle differs from an expected duty cycle or range of duty cycles, and if so, reducing the target temperature, or stopping the supply of current to the heating element or limiting the duty cycle of the pulses of electrical current supplied to the heating element.

The heating element may be part of an aerosol generating device, such as an electrically heating smoking device. The heating element may be configured to heat an aerosol-forming substrate continuously during operation of the device. An aerosol-forming substrate in this context is a substrate capable of releasing upon heating volatile compounds, which can form an aerosol. "Continuously" in this context means that heating is not dependent on air flow through the device. As the aerosol forming constituents of the aerosol-forming substrate become exhausted during heating, the power required to maintain a given target temperature falls. Depending on the evolution of the target temperature during operation of the heating element, the duty cycle may be limited to reduce the risk of combustion of the substrate occurring.

As the temperature is maintained at a known target temperature, any variation in the duty cycle or range of duty cycles expected to maintain the target temperature is indicative of abnormal conditions. For example, if the duty cycle remains much lower than expected while the temperature is maintained, it may be due to an external heat source, such as a combusting substrate. If the duty cycle remains higher than expected it may be due to abnormal cooling of the heating element as a result of excessive airflow past the heater, which in a smoking device means intense puffing by the user. Intense puffing can lead to a higher oxygen concentration that increases the chance of undesirable combustion of the aerosol-forming substrate.

The heating element may be an electrically resistive heating element and the step of maintaining the temperature of the heating element at the target temperature may comprise determining the electrical resistance of the heating element and adjusting the electrical current supplied to the heating element dependent on the determined electrical resistance. The step of maintaining the temperature of the heating element at the target temperature may comprise using a PID control loop. Alternatively, other mechanisms for maintaining the temperature may be used, such as a simple thermostat type on/off control mechanism that is less expensive than a PID control loop. Furthermore, mechanisms for temperature sensing other than detecting the electrical resistance of the heating element may be used, such as bimetallic strips, thermocouples or a dedicated thermistor or electrically resistive element that is electrically separate to the heating element. These alternative temperature sensing mechanisms may be used in addition to or instead of determining temperature by monitoring the electrical resistance of the heating element. For example, a separate temperature sensing mechanism may be used in a control mechanism for cutting power to the heating element when the temperature of the heating element exceeds a target temperature.

The step of determining if the duty cycle differs from an expected duty cycle may comprise periodically comparing the duty cycle with a first threshold duty cycle and using a hysteresis control loop to determine a trigger point at which to reduce the target temperature or limit the duty cycle of the pulses of electrical current. Using a hysteresis control loop ensures that very short term fluctuations in duty cycle do not trigger a reduction in temperature or applied power. Only after a sustained period of abnormal duty cycle behaviour is the trigger point reached.

The method may comprise, if the duty cycle is less than a second threshold duty cycle while the temperature is at or above the target temperature, cutting the supply of electrical current to the heating element. As described, a very low duty cycle with a sustained temperature is indicative of an external heat source and may be the result of combustion of a substrate adjacent to or surrounding the heating element. In this circumstance the power to the heating element may be cut to ensure that the user of the device does not receive any more undesirable compounds.

The method may comprise limiting the duty cycle of the pulses of electrical current to a maximum duty cycle limit. The maximum duty cycle limit may be varied on the basis of a pre-programmed control strategy. For example the maximum duty cycle may be reduced with increasing time, either stepwise or continuously, as the substrate dries out. The first or second threshold, or both the first and second threshold, may be proportional to the maximum duty cycle limit. For example, the first threshold may be maximum duty cycle limit. The second threshold may be a fixed proportion of the maximum duty cycle limit or may be a fixed duty cycle. Alternatively, both the first and second thresholds may be absolute limits.

In another aspect of the disclosure, there is provided a device for controlling an electrical heating element, comprising:

a control circuit connected to the heating element, configured to maintain the temperature of the heating element at a target temperature by supplying pulses of electrical current to the heating element; and a detection circuit configured to monitor the duty cycle of the pulses of electrical current and if the duty cycle of the pulses of electrical current differs from an expected duty cycle or range of duty cycles, to instruct the control circuit to reduce the target temperature or stop the supply of current to the heating element or limit the duty cycle or the pulses of electrical current.

The heating element may be an electrically resistive heating element and the control circuit is configured to maintain the temperature of the heating element at the target temperature by determining the electrical resistance of the heating element and adjusting the electrical current supplied to the heating element dependent on the determined electrical resistance. The control circuit may comprise a PID control loop.

The detection circuit may be configured to periodically compare the duty cycle with a first threshold duty cycle and may comprise a hysteresis control loop configured to determine a trigger point at which to reduce the target temperature or limit the duty cycle of the pulses of electrical current.

The detection circuit may be configured such that if the duty cycle is less than a second threshold duty cycle while the temperature is at or above the target temperature, the detection circuit instructs the control circuit to cut the supply of electrical current to the heating element.

The target temperature may be constant or may alter with time.

The control circuit may be configured to limit the duty cycle of the pulses of electrical current to a maximum duty cycle limit, wherein for a given target temperature the maximum duty cycle limit is progressively reduced with increasing time following activation of the heating element. If the target temperature is configured to increase with time at any point following activation of the heating element, then the maximum duty cycle may also increase. In one embodiment the variable A, where A is equal to the maximum duty cycle divided by the target temperature, is progressively reduced with increasing time following activation of the heating element.

The control circuit may be configured to cut the supply of electrical current to the heating element if the temperature of the heating element exceeds a temperature threshold. For example, if the temperature of the heating element is detected to be 7° C. or more above the target temperature the supply of power may be cut as the risk of combustion would otherwise be too high.

The device may be an aerosol generating device comprising a heating element, such as an electrically heating smoking device. The heating element may be configured to heat an aerosol-forming substrate continuously during operation of the device.

The aerosol generating device may be configured to receive an aerosol-forming substrate, and wherein the expected duty cycle or range of duty cycles is configurable dependent on a characteristic of the aerosol-forming substrate.

In a further aspect of the disclosure, there is provided an aerosol generating system, comprising:

an aerosol generating device comprising a heating element, and an aerosol generating article comprising an aerosol forming substrate, wherein the heater is configured to heat the aerosol forming substrate to generate an aerosol, and wherein the aerosol generating device comprises: a control circuit connected to the heating element, configured to maintain the temperature of the heating element at a target temperature by supplying pulses of electrical current to the heating element;

a detection circuit configured to monitor the duty cycle of the pulses of electrical current and if the duty cycle of the pulses of electrical current differs from an expected duty cycle or range of duty cycles, to instruct the control circuit to reduce the target temperature or stop the supply of current to the heating element or limit the duty cycle or the pulses of electrical current.

The aerosol generating device may be configured so that the expected duty cycle or range of duty cycles is dependent on a characteristic of the aerosol-forming substrate. The aerosol generating article may include means to allow the characteristic to be determined by the aerosol generating device, such as an electrically resistive component, optically detectable indicia or a characteristic shape or dimension. Different substrates may combust under different conditions and may contain different amounts of aerosol former or liquid, and so may be at risk of combustion at different temperatures and times.

In another aspect of the disclosure, there is provided a method of controlling an electrical heating element, comprising:

maintaining the temperature of the heating element at a target temperature during a plurality of heating phases by supplying electrical power to the heating element;

limiting the power supplied to the heating element during each heating phase to a threshold power level, such that a variable B, where B is equal to the threshold power level divided by the target temperature, is progressively reduced with increasing time following activation of the heating element.

The heating element may be part of an aerosol generating device, such as an electrically heating smoking device. The heating element may be configured to heat an aerosol-forming substrate continuously during operation of the device. "Continuously" in this context means that heating is not dependent on air flow through the device. As the aerosol forming constituents of the aerosol-forming substrate become exhausted during heating, the power required to maintain a given target temperature falls. The target temperature of the heating element may change during operation of the heating element and the duty cycle may be correspondingly limited to reduce the risk of combustion of the substrate occurring. If the target temperature is configured to increase with time at any point following activation of the heating element, then the maximum duty cycle may also increase.

The step of maintaining may comprise supplying power as pulses of electrical current, and the step of limiting the power supplied may comprise limiting the duty cycle of the pulses of electrical current to below a threshold duty cycle, the threshold duty cycle divided by the target temperature being progressively reduced for each successive heating phase following activation of the heating element.

Alternatively, or in addition, the step of limiting the power supplied may comprise limiting the voltage applied to the heating element to below a threshold voltage.

In a further aspect of the disclosure, there is provided a device for controlling an electrical heating element, comprising:

a control circuit coupled to a heating element, the control circuit configure to maintain the temperature of the heating element at a target temperature during a plurality of heating phases by supplying electrical power to the heating element, and to limit the power supplied to the heating element during each heating phase to a threshold power level, such that a variable B, where B is equal to the threshold power level divided by the target temperature, is progressively reduced with increasing time following activation of the heating element.

The control circuit may be configured to supply power as pulses of electrical current, and to limit the power supplied to the heating element by limiting the duty cycle of the pulses of electrical current to below a threshold duty cycle, the threshold duty cycle divided by the target temperature being progressively reduced for each successive heating phase following activation of the heating element.

The device may be an aerosol generating device comprising a heating element, such as an electrically heating smoking device.

The aerosol generating device may be configured to receive an aerosol-forming substrate, and the duration of the heating phases and the threshold duty cycle for each heating phase may be configurable dependent on a user input to the control circuit or dependent on a sensed characteristic of the aerosol-forming substrate or dependent on a sensed environmental parameter. So a particular substrate may require a different heating profile in order to give desirable results and different users may prefer different heating profiles.

In a further aspect of the disclosure, there is provided an aerosol generating system, comprising:

an aerosol generating device comprising a heating element, and an aerosol generating article comprising an aerosol forming substrate, wherein the heater is configured to heat the aerosol forming substrate to generate an aerosol, and wherein the aerosol generating device comprises: a control circuit coupled to the heating element, the control circuit configure to maintain the temperature of the heating element at a target temperature during a plurality of heating phases by supplying electrical power to the heating element, and to limit the power supplied to the heating element during each heating phase to a threshold power level, such that a variable B, where B is equal to the threshold power level divided by the target temperature, is progressively reduced with increasing time following activation of the heating element.

The aerosol generating device may be configured so that the threshold power level is dependent on a characteristic of the aerosol-forming substrate. The aerosol generating article may include means to allow the characteristic to be determined by the aerosol generating device, such as an electrically resistive component, optically detectable indicia or a characteristic shape or dimension. Different substrates may combust under different conditions and may contain different amounts of aerosol former or liquid, and so may be at risk of combustion at different temperatures and times.

The control of the heating element as described in any of the preceding aspects of the disclosure may be implemented in a computer program which, when run on programmable electric circuitry for an electrically operated aerosol generating device, causes the programmable electric circuitry to perform the control method. The computer program may be provided on a computer readable storage medium.

In a still further aspect of the disclosure, there is provided an aerosol generating device comprising:

an electrical heating element;

a detection circuit configured to detect a temperature of the heating element; and a control circuit coupled to the heating element and the detection circuit, wherein the control circuit is configured to control the supply of power to the heating element from a power source, and wherein the control circuit is configured to prevent the supply of power to the heating element from the power source if the detection circuit detects that the temperature of the heating element is above a threshold temperature.

The threshold temperature may vary with time following activation of the heating element. The aerosol generating device may be an electrically heated smoking device.

In yet a further aspect of the disclosure, there is provided an aerosol generating system, comprising:

an aerosol generating device comprising a heating element, and an aerosol generating article comprising an aerosol forming substrate, wherein the heater is configured to heat the aerosol forming substrate to generate an aerosol, and wherein the aerosol generating device comprises: a detection circuit configured to detect a temperature of the heating element; and a control circuit coupled to the heating element and the detection circuit, wherein the control circuit is configured to control the supply of power to the heating element from a power source, and wherein the control circuit is configured to prevent the supply of power to the heating element from the power source if the detection circuit detects that the temperature of the heating element is above a threshold temperature.

In all of the aspects of the disclosure, the heating element may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

As described, in any of the aspects of the disclosure, the heating element may be part of an aerosol generating device. The aerosol generating device may comprise an internal heating element or an external heating element, or both internal and external heating elements, where "internal" and "external" refer to the aerosol-forming substrate. An internal heating element may take any suitable form. For example, an internal heating element may take the form of a heating blade. Alternatively, the internal heater may take the form of a casing or substrate having different electro-conductive portions, or an electrically resistive metallic tube. Alternatively, the internal heating element may be one or more heating needles or rods that run through the centre of the aerosol-forming substrate. Other alternatives include a heating wire or filament, for example a Ni—Cr (Nickel-Chromium), platinum, tungsten or alloy wire or a heating plate. Optionally, the internal heating element may be deposited in or on a rigid carrier material. In one such embodiment, the electrically resistive heating element may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external heating element may take any suitable form. For example, an external heating element may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. An external heating element may also be formed using a metal having a defined relationship between temperature and resistivity. In such an exemplary device, the metal may be formed as a track between two layers of suitable insulating materials. An external heating element formed in this manner may be used to both heat and monitor the temperature of the external heating element during operation.

The internal or external heating element may comprise a heat sink, or heat reservoir comprising a material capable of absorbing and storing heat and subsequently releasing the heat over time to the aerosol-forming substrate. The heat sink may be formed of any suitable material, such as a suitable metal or ceramic material. In one embodiment, the material has a high heat capacity (sensible heat storage material), or is a material capable of absorbing and subsequently releasing heat via a reversible process, such as a high temperature phase change. Suitable sensible heat storage materials include silica gel, alumina, carbon, glass mat, glass fibre, minerals, a metal or alloy such as aluminium, silver or lead, and a cellulose material such as paper. Other suitable materials which release heat via a reversible phase change include paraffin, sodium acetate, naphthalene, wax, polyethylene oxide, a metal, metal salt, a mixture of eutectic salts or an alloy. The heat sink or heat reservoir may be arranged such that it is directly in contact with the aerosol-forming substrate and can transfer the stored heat directly to the substrate. Alternatively, the heat stored in the heat sink or heat reservoir may be transferred to the aerosol-forming substrate by means of a heat conductor, such as a metallic tube.

The heating element advantageously heats the aerosol-forming substrate by means of conduction. The heating element may be at least partially in contact with the substrate, or the carrier on which the substrate is deposited. Alternatively, the heat from either an internal or external heating element may be conducted to the substrate by means of a heat conductive element.

During operation, the aerosol-forming substrate may be completely contained within the aerosol-generating device. In that case, a user may puff on a mouthpiece of the aerosol-generating device. Alternatively, during operation a smoking article containing the aerosol-forming substrate may be partially contained within the aerosol-generating device. In that case, the user may puff directly on the smoking article.

The smoking article may be substantially cylindrical in shape. The smoking article may be substantially elongate. The smoking article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The smoking article may have a total length between approximately 30 mm and approximately 100 mm. The smoking article may have an external diameter between approximately 5 mm and approximately 12 mm. The smoking article may comprise a filter plug. The filter plug may be located at the downstream end of the smoking article. The filter plug may be a cellulose acetate filter plug. The filter plug is approximately 7 mm in length in one embodiment, but may have a length of between approximately 5 mm to approximately 10 mm.

In one embodiment, the smoking article has a total length of approximately 45 mm. The smoking article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The smoking article may comprise an outer paper wrapper. Further, the smoking article may comprise a separation between the aerosol-forming substrate and the filter plug. The separation may be approximately 18 mm, but may be in the range of approximately 5 mm to approximately 25 mm.

The aerosol-forming substrate may be a solid aerosol-forming substrate. Alternatively, the aerosol-forming substrate may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid.

Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

The aerosol-generating device may further comprise a power supply for supplying power to the heating element. The power supply may be any suitable power supply, for example a DC voltage source. In one embodiment, the power supply is a Lithium-ion battery. Alternatively, the power supply may be a Nickel-metal hydride battery, a Nickel cadmium battery, or a Lithium based battery, for example a Lithium-Cobalt, a Lithium-Iron-Phosphate, Lithium Titanate or a Lithium-Polymer battery.

Although the disclosure has been described by reference to different aspects, it should be clear that features described in relation to one aspect of the disclosure may be applied to the other aspects of the disclosure.

Examples of the invention will now be described in detail with reference to the accompanying drawings, in which.

Figure 1:
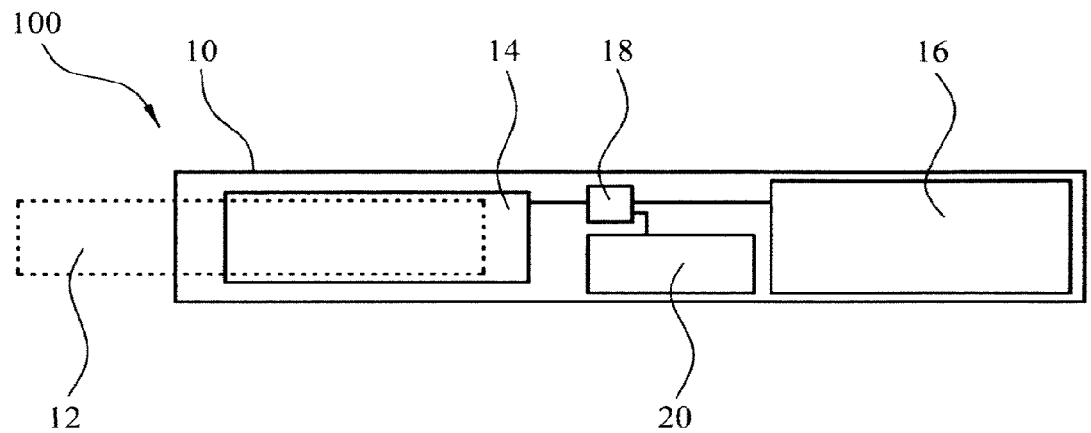
FIG. 1 is a schematic diagram of an aerosol generating device.

In FIG. 1, the components of an embodiment of an electrically heated aerosol generating device 100 are shown in a simplified manner. Particularly, the elements of the electrically heated aerosol generating device 100 are not drawn to scale in FIG. 1. Elements that are not relevant for the understanding of this embodiment have been omitted to simplify FIG. 1.

The electrically heated aerosol generating device 100 comprises a housing 10 and an aerosol-forming substrate 12, for example a cigarette. The aerosol-forming substrate 12 is pushed inside the housing 10 to come into thermal proximity with the heating element 14. The aerosol-forming substrate 12 will release a range of volatile compounds at different temperatures. By controlling the maximum operation temperature of the electrically heated aerosol generating device 100 to be below the release temperature of some of the volatile compounds, the release or formation of these smoke constituents can be avoided.

Within the housing 10 there is an electrical energy supply 16, for example a rechargeable lithium ion battery. A controller 18 is connected to the heating element 14, the electrical energy supply 16, and a user interface 20, for example a button or display. The controller 18 controls the power supplied to the heating element 14 in order to regulate its temperature. Typically the aerosol-forming substrate is heated to a temperature of between 250 and 450 degrees centigrade.

Figure 2:
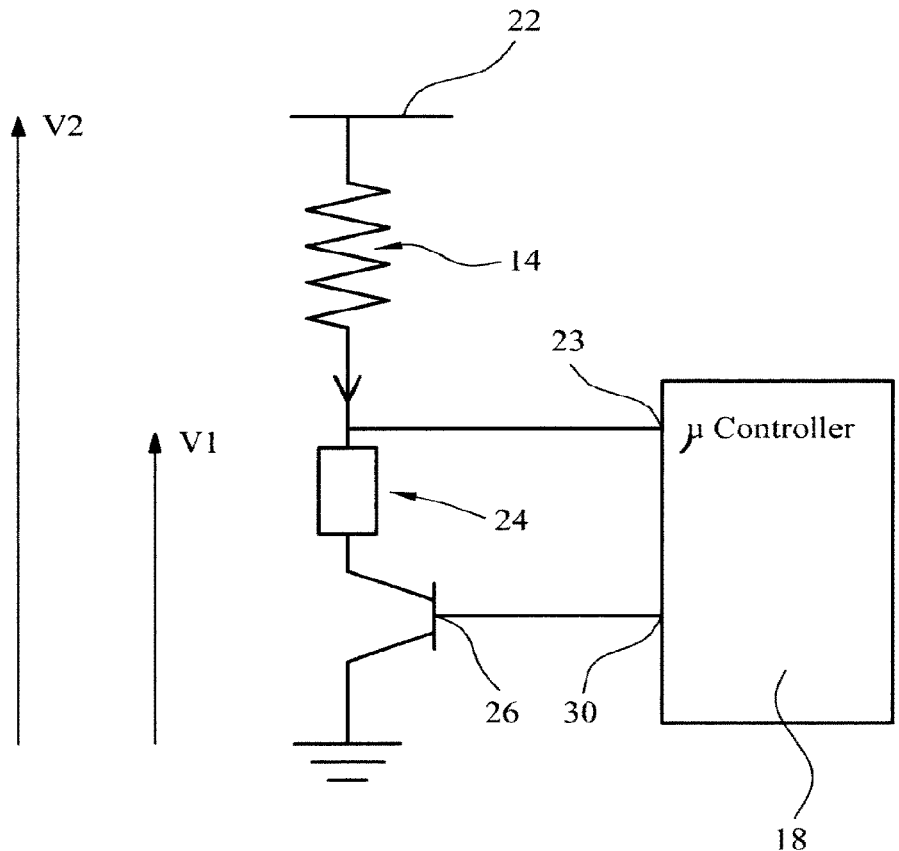
FIG. 2 is a schematic diagram of a temperature control circuit for a device of the type shown in FIG. 1.

FIG. 2 illustrates control circuitry used to provide the described temperature regulation in accordance with one embodiment of the invention.

The heater 14 is connected to the battery through connection 22. The battery 16 provides a voltage V2. In series with the heating element 14, an additional resistor 24, with known resistance r, is inserted and connected to voltage V1, intermediate between ground and voltage V2. The frequency modulation of the current is controlled by the microcontroller 18 and delivered via its analog output 30 to the transistor 26 which acts as a simple switch.

The regulation is based on a PID regulator that is part of the software integrated in the microcontroller 18. The temperature (or an indication of the temperature) of the heating element is determined by measuring the electrical resistance of the heating element. The temperature is used to adjust the duty cycle, in this case the frequency modulation, of the pulses of current supplied to the heating element in order to maintain the heating element at a target temperature. The temperature is determined at a frequency chosen to match the control of the duty cycle, and may be determined as often as once every 100 ms.

The analog input 28 on the microcontroller 18 is used to collect the voltage across the resistance 24 and provides the image of the electrical current flowing in the heating element. The battery voltage V+ and the voltage across resistor 24 are used to calculate the heating element resistance variation and or its temperature.

The heater resistance to be measured at a particular temperature is $R_{heater}$. In order for microprocessor 18 to measure the resistance $R_{heater}$ of the heater 14, the current through the heater 14 and the voltage across the heater 14 can both be determined. Then, the following well-known formula can be used to determine the resistance:

$$V = IR \qquad (1)$$

In FIG. 2, the voltage across the heater is V2−V1 and the current through the heater is I. Thus:

$$R_{heater} = \frac{V2 - V1}{I} \qquad (2)$$

The additional resistor 24, whose resistance r is known, is used to determine the current I, again using (1) above. The current through the resistor 24 is I and the voltage across the resistor 24 is V1. Thus:

$$I = \frac{V1}{r} \qquad (3)$$

So, combining (2) and (3) gives:

$$R_{heater} = \frac{(V2 - V1)}{V1} r \qquad (4)$$

Thus, the microprocessor 18 can measure V2 and V1, as the aerosol generating system is being used and, knowing the value of r, can determine the heater's resistance at a particular temperature, $R_{heater}$.

The heater resistance is correlated to temperature. A linear approximation can be used to relate the temperature T to the measured resistance $R_{heater}$ at temperature T according to the following formula:

$$T = \frac{R_{heater}}{AR_0} + T_0 - \frac{1}{A} \qquad (5)$$

where A is the thermal resistivity coefficient of the heating element material and $R_0$ is the resistance of the heating element at room temperature $T_0$.

Other, more complex, methods for approximating the relationship between resistance and temperature can be used if a simple linear approximation is not accurate enough over the range of operating temperatures. For example, in another embodiment, a relation can be derived based on a combination of two or more linear approximations, each covering a different temperature range. This scheme relies on three or more temperature calibration points at which the resistance of the heater is measured. For temperatures intermediate the calibration points, the resistance values are interpolated from the values at the calibration points. The calibration point temperatures are chosen to cover the expected temperature range of the heater during operation.

An advantage of these embodiments is that no temperature sensor, which can be bulky and expensive, is required. Also the resistance value can be used directly by the PID regulator instead of temperature. If the resistance value is held within a desired range, so too will the temperature of the heating element. Accordingly the actual temperature of the heating element need not be calculated. However, it is possible to use a separate temperature sensor and connect that to the microcontroller to provide the necessary temperature information.

Figure 3:
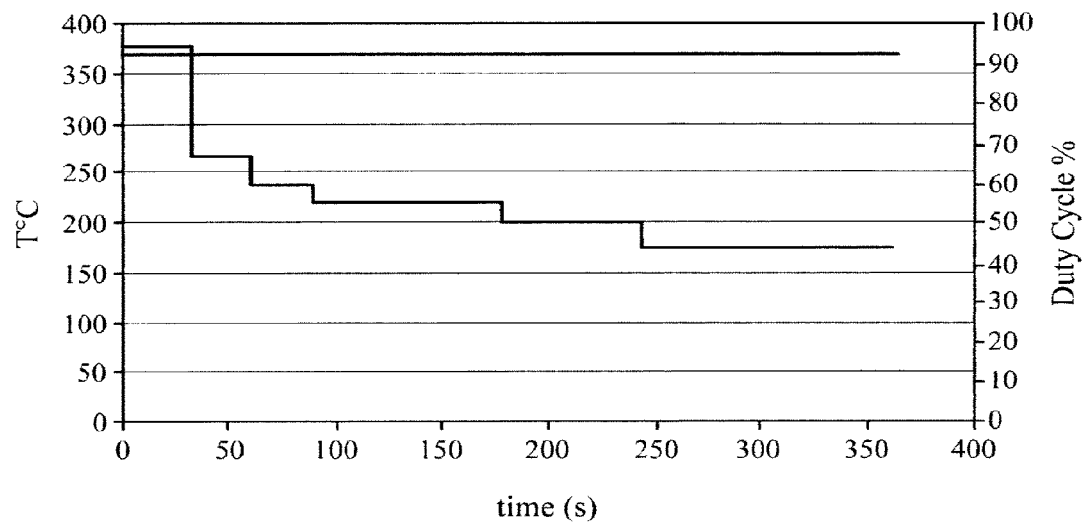
FIG. 3 illustrates an evolution of a maximum duty cycle limit during a smoking session using a device of the type shown in FIG. 1.

The microcontroller may be programmed to limit the maximum allowed duty cycle. The maximum allowed duty cycle may change with time following activation of the heating element. FIG. 3 illustrates the progress a smoking session using a device of the type shown in FIG. 1. The target temperature of the heating element is indicated by line 30, and as can be seen is maintained at 375° C. through the smoking session, which lasts for six minutes in total. The smoking session is split into phases by the microcontroller, with different maximum duty cycle limits in different phases. Duty cycle in this context means the percentage of time that the power is being supplied, with switch 26 closed. In the example illustrate in FIG. 3, in a first phase the duty cycle is limited to 95% for 30 seconds. During this period the heating element is being raised to the target temperature. In a second phase, again of 30 seconds, the duty cycle is limited to 65%. Less power is required to maintain the temperature of the heating element than is required to heat it up. In a third phase of 30 seconds the duty cycle is limited to 60%. In a fourth phase of 90 seconds the duty cycle is limited to 55%, in a fifth phase of 60 seconds the duty cycle is limited 50%, and in a sixth phase of 120 seconds the duty cycle is limited to 45%.

As the substrate is depleted less heat is removed by vaporisation so less power is required to maintain the temperature of the heating element at the target temperature. Furthermore, the temperature of the surrounding parts of the device increases with time and so absorb less energy with time. Accordingly, to reduce the chance of combustion, the maximum permitted power is reduced with time for a given target temperature. As a general rule, the maximum permitted power or maximum duty cycle, divided by the target temperature, is reduced progressively with time following activation of the heating element during a single smoking session.

Excessive puffing behaviour may also be determined. Each time a user takes a puff on the device, drawing air past the heating element, the amount of oxygen in contact with the substrate is increased, increasing the chance of combustion at a given temperature. With each puff heating element is cooled. The temperature control loop will compensate for this cooling by raising the duty cycle of the current pulses temporarily. Extended periods at or near to the duty cycle limit may be indicative of excessive puffing and trigger a reduction in the duty cycle limit.

By limiting the maximum duty cycle to a level which would be expected within the bounds of "normal" user behaviour and environmental conditions, temperature spikes may be avoided. Clearly, the duty cycle limit and the way in which it changes over time can be experimentally determined to suit particular device designs, substrates and usage scenarios.

The duty cycle of the current pulses can be monitored by the microcontroller, and if the duty cycle differs from an expected duty cycle over a sustained period, the microcontroller can take corrective action or can terminate the supply of power to the heating element.

Figure 4:
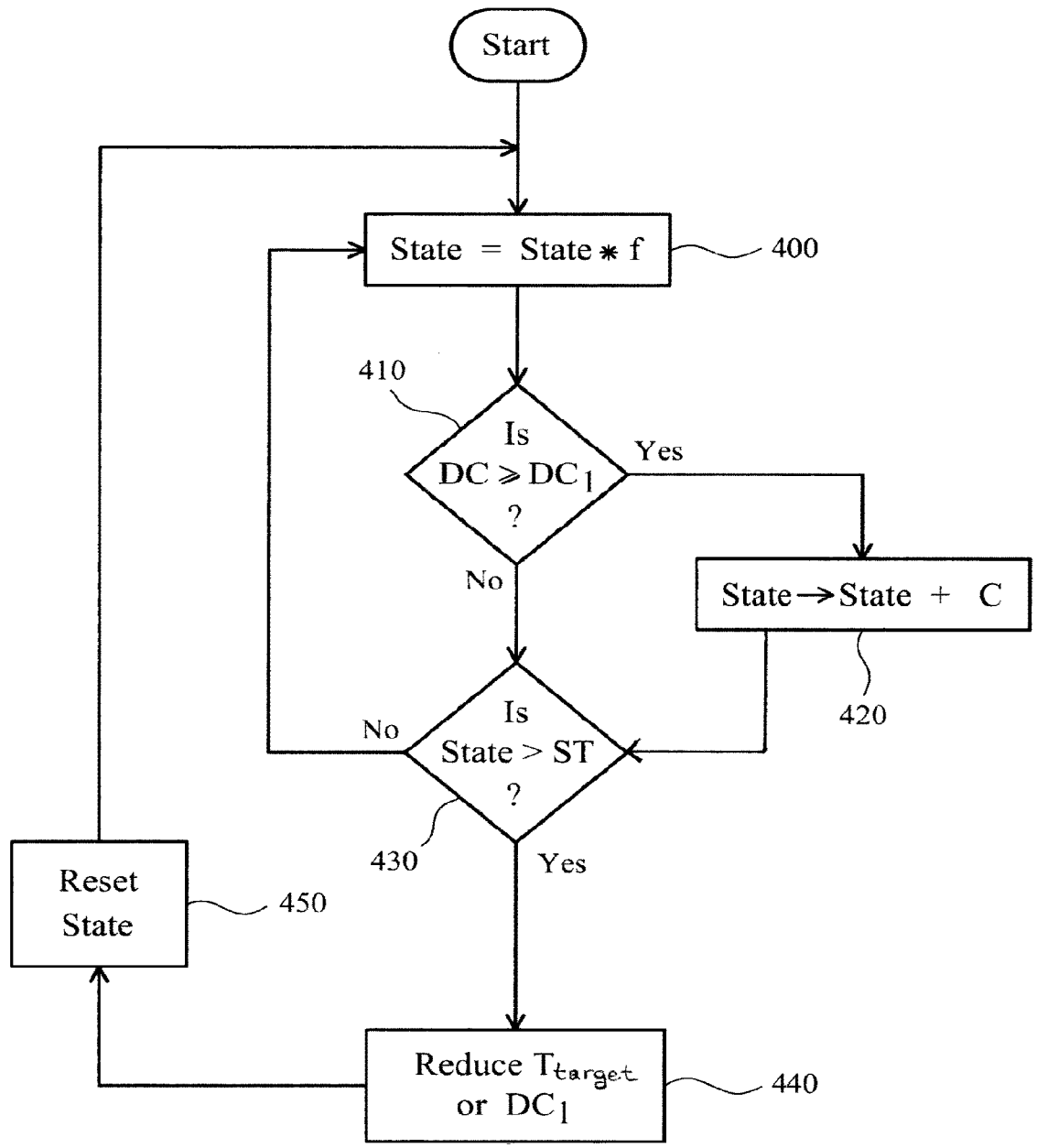
FIG. 4 is a flow diagram illustrating one process for detecting abnormal duty cycle patterns.

The maximum duty cycle limit may be set to be an upper limit of an expected duty cycle level for normal user behaviour or set to suit a particular user in accordance with his or her preference. If the actual duty cycle is then at the maximum duty cycle limit for much of the time it is indicative that the system is being cooled more than expected by excessive user puffing. As described above, with excessive puffing there is an increased risk of combustion owing to increased oxygen in contact with the substrate. FIG. 4 illustrates a hysteresis control loop, using a Schmitt trigger debounce approach, for detecting such abnormal puffing behaviour and reducing the target temperature or duty cycle limit when such abnormal puffing is detected. However, it should be clear that there are alternatives to a Schmitt trigger control loop, such as a sliding window control, Infinite Impulse Response (IIR) filters and Finite Impulse Response (FIR) filters.

The process of FIG. 4 starts and proceeds to step 400, in which an arbitrary state variable "state", which is initially set as 0 is modified by a factor f, which is less than one, say example 0.75. In step 410 the duty cycle is compared with a duty cycle threshold value $DC_1$. If the duty cycle is greater than or equal to the duty cycle threshold value then the state variable is increased by amount c, say 0.25, in step 420 before passing to step 430. The duty cycle threshold value $DC_1$ may be the maximum duty cycle limit of some proportion of the maximum duty cycle limit. If the duty cycle is less that the threshold duty cycle the state variable is unchanged and the process moves to step 430. The state variable is then compared with a state threshold ST in step 430. The state threshold may be step as 0.8 for example. If the state variable is less than or equal to the state threshold then the process returns to step 400. If the state variable is greater than the state threshold then a pre-burning condition is detected and the either target temperature of the heating element or the maximum duty cycle limit is reduced in step 440. The state variable is then reset in step 450 before the process returns to step 400.

The process of FIG. 4 ensures that very short term fluctuations do not trigger a pre-burning condition detection. Only if the duty cycle exceeds the threshold duty cycle for several cycles of the control process will the pre-burning condition be detected. The control loop of FIG. 4 is repeated periodically, for example every 100 ms, corresponding to the frequency of the PID regulator control loop.

Figure 5:
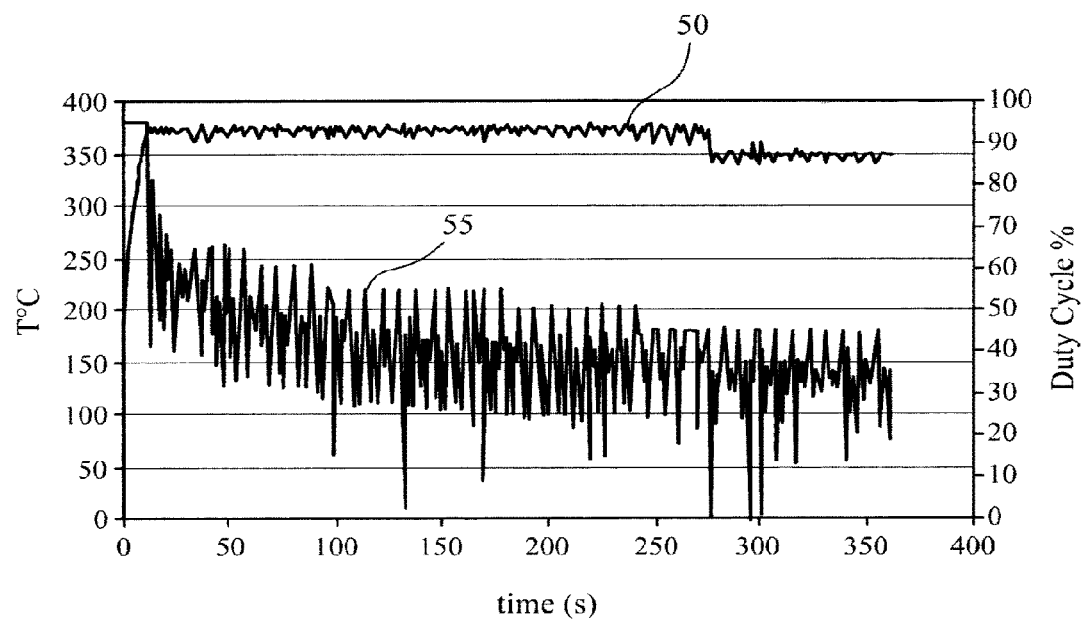
FIG. 5 illustrates an example of a temperature reduction of the heating element following detection of excessive puffing by a user.

FIG. 5 illustrates a reduction in the target temperature resulting from a control process as illustrated in FIG. 4. The upper line 50 indicates the temperature of the heating element. The lower line 55 is the duty cycle of the current signal. FIG. 5 shows that at around 275 seconds after the start of the smoking session, the pre-burning detection mechanism triggered because, starting at around 240 seconds, a lower duty cycle limit caused the temperature to drop more during puffs and the system compensated by keeping the duty cycle at its upper limit for a longer time. The target temperature was then reduced to 350° C.

Figure 6:
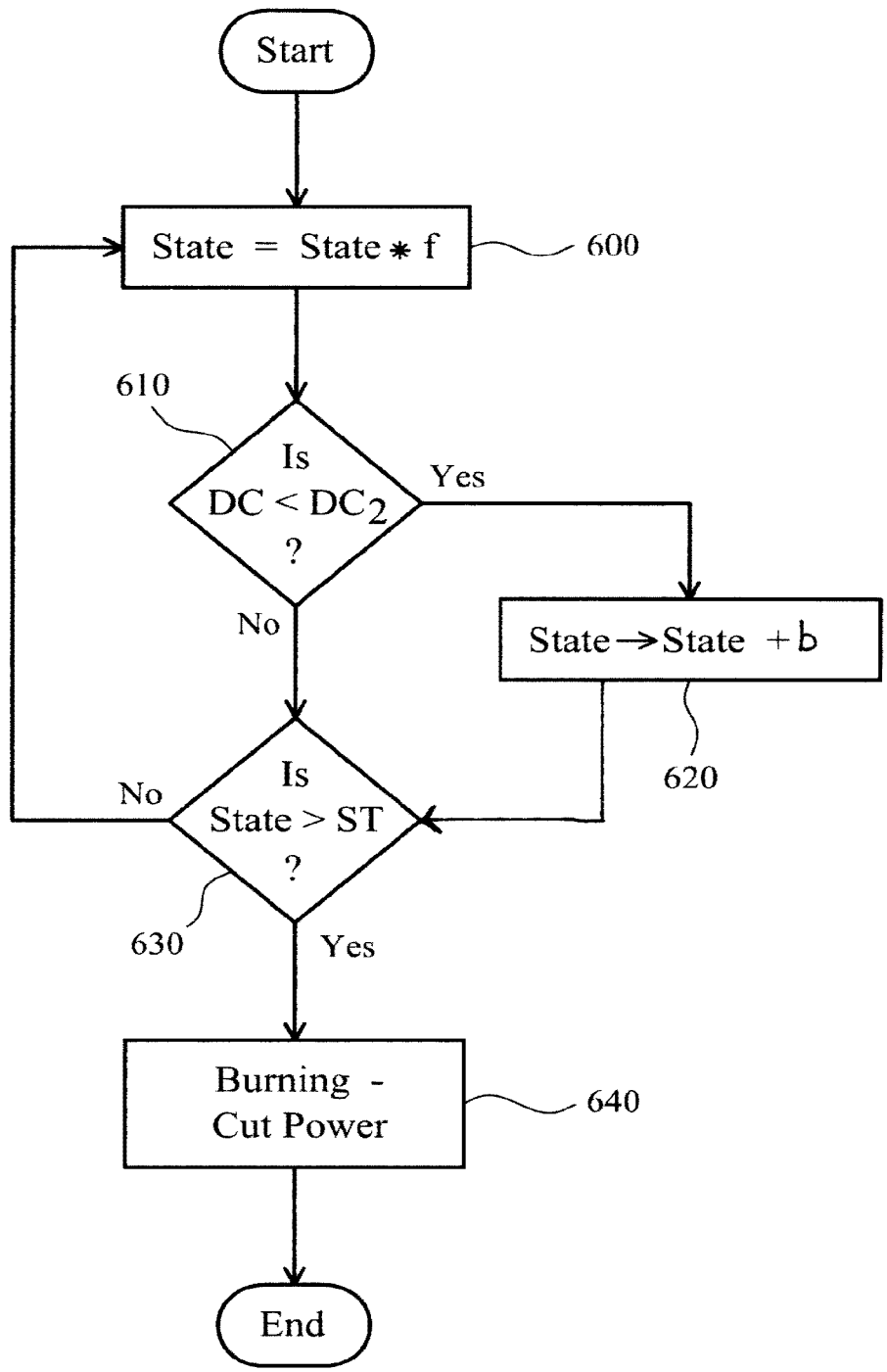
FIG. 6 is a flow diagram illustrating one process for detecting combustion of the substrate.

FIG. 6 illustrates a hysteresis control loop, again using a Schmitt trigger debounce approach, for detecting combustion of the substrate. In step 600 an arbitrary state variable "state", which is initially set as 0, is modified by a factor f, which is less than one, say example 0.9. In step 610 the duty cycle is compared to a second duty cycle threshold $DC_2$. The second duty cycle threshold is set at 75% of the maximum duty cycle threshold. If the duty cycle is less that the second duty cycle threshold the state variable is incremented by b, in this example 0.3, in step 620, before proceeding to step 630. If the duty cycle is greater than or equal to the second duty cycle threshold, then the state variable is unchanged and the process proceeds directly to step 630. In step 630 the state variable is compared with a state variable threshold ST, which is equal to one in this example. If the state variable is greater than ST then the power supply is cut to the heating element. The microprocessor simply holds switch 26 open. The process then ends. If the state variable is less than or equal to ST the process returns to step 600.

Figure 7:
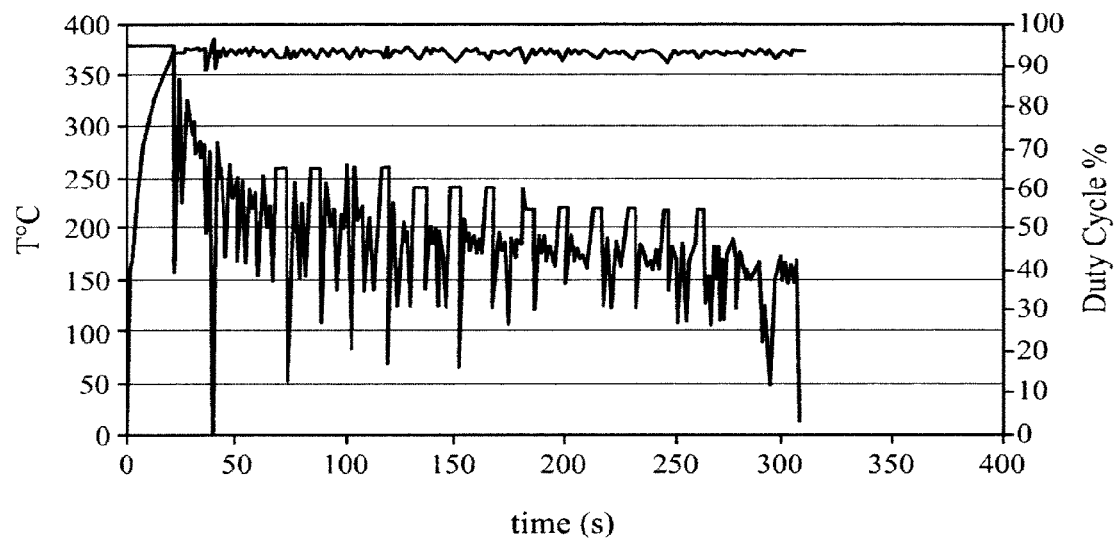
FIG. 7 illustrates an example of combustion detection using a process as illustrated in FIG. 6.

FIG. 7 illustrates a burning detection using a process of the type shown in FIG. 6. FIG. 7 shows a significant drop in duty cycle at around 140 seconds, but this was not sufficient to trigger the burning detection mechanism. However, at around 155 seconds, the duty cycle dropped below the burning detection filter minimum limit and stayed low for some time while the temperature remained at or above a predetermined target. The comparison of actual temperature with the predetermined target may incorporated into the control loop of FIG. 6 or may be implemented as a separate process. This triggered the immediate stop of power to the heating element. In effect, the burning detection mechanism detected energy starting to come from the substrate rather than from its electrical source and stopped the smoking experience before the substrate entered auto-combustion.

Figure 8:
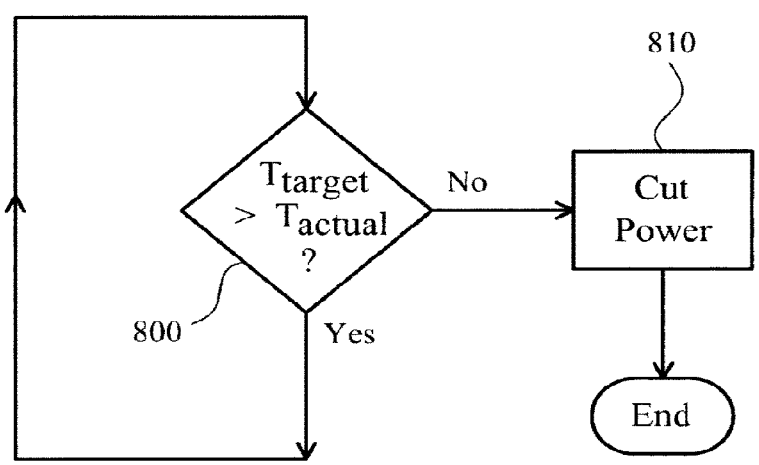
FIG. 8 is a flow diagram illustrating a process for cutting power to the heating element following detection of undesirably high temperature.

In addition to the pre-burning and burning detection processes described with reference to FIGS. 4 and 6, power to the heating element may be cut on the basis of detected temperature alone. FIG. 8 illustrates an example of a control loop for cutting power based on detection of excessive temperature. The control loop of FIG. 8 may be incorporated into the control loop of FIG. 4 or FIG. 6. For example, in the process of FIG. 4, step 800 of FIG. 8 may be performed immediately prior to step 400 in each loop. Alternatively, the control loop of FIG. 8 may be implemented as a separate control loop. In step 800 the actual detected temperature $T_{actual}$ (as determined by the resistance of the heating element or by a separate temperature sensor) is compared with the target temperature $T_{target}$. If the actual temperature is less than the target temperature the process is repeated or, if incorporated into another control process, the remaining step of the control process are performed. If the actual temperature is at or exceeds the target temperature the process proceeds to step 810, in which power to the heating element is cut. Power to the heating element may be cut by the microcontroller controlling a switch, such as switch 26 in FIG. 2. The device may then be prevented from operating for a predetermined period of time, during which the heating element cools to an acceptable temperature. The use of a simple temperature threshold for cutting power to the heating element provides a direct way to prevent or reduce the likelihood of combustion of the substrate.

The exemplary embodiments described above illustrate but are not limiting. In view of the above discussed exemplary embodiments, other embodiments consistent with the above exemplary embodiments will now be apparent to one of ordinary skill in the art.

The invention claimed is:

1. A method of controlling an electrical heating element, comprising:
   maintaining a temperature of the heating element at a target temperature during a plurality of heating phases by supplying electrical power to the heating element;
   limiting the power supplied to the heating element during each heating phase to a threshold power level, such that a variable B, where B is equal to the threshold power level divided by the target temperature, is progressively reduced with increasing time following activation of the heating element.

2. The method according to claim 1, wherein the step of maintaining comprises supplying power as pulses of electrical current, and wherein the step of limiting the power supplied comprises limiting a duty cycle of the pulses of electrical current to below a threshold duty cycle, the threshold duty cycle divided by the target temperature being progressively reduced for each successive heating phase following activation of the heating element.

3. The method according to claim 2, wherein the step of limiting the power supplied comprises limiting a voltage applied to the heating element to below a threshold voltage.

4. A device for controlling an electrical heating element, comprising:
   a control circuit coupled to a heating element, the control circuit being configured to maintain a temperature of the heating element at a target temperature during a plurality of heating phases by supplying electrical power to the heating element, and to limit the power supplied to the heating element during each heating phase to a threshold power level, such that a variable B, where B is equal to the threshold power level divided by the target temperature, is progressively reduced with increasing time following activation of the heating element.

5. The device according to claim 4, wherein the control circuit is configured to supply power as pulses of electrical current, and to limit the power supplied to the heating element by limiting a duty cycle of the pulses of electrical current to below a threshold duty cycle, the threshold duty cycle divided by the target temperature being progressively reduced for each successive heating phase following activation of the heating element.

6. The device according to claim 4, wherein the device is an aerosol generating device comprising a heating element, the aerosol generating device comprising an electrically heating smoking device.

7. The device according to claim 6, wherein the aerosol generating device is configured to receive an aerosol-forming substrate, and wherein the duration of the heating phases and the threshold duty cycle for each heating phase is configurable dependent on a user input to the control circuit or dependent on a sensed characteristic of the aerosol-forming substrate or dependent on a sensed environmental parameter.

8. An aerosol generating system, comprising:
   an aerosol generating device comprising a heating element, and an aerosol generating article comprising an aerosol forming substrate, wherein the heating element is configured to heat the aerosol forming substrate to generate an aerosol, and wherein the aerosol generating device comprises: a control circuit coupled to the heating element, the control circuit being configured to maintain a temperature of the heating element at a target temperature during a plurality of heating phases by supplying electrical power to the heating element, and to limit the power supplied to the heating element during each heating phase to a threshold power level, such that a variable B, where B is equal to the threshold power level divided by the target temperature, is progressively reduced with increasing time following activation of the heating element.

9. The system according to claim 8, wherein the aerosol generating device is configured so that the threshold power level is dependent on a characteristic of the aerosol-forming substrate.

10. A non-transitory computer readable storage medium having a computer program stored thereon, which, when run on programmable electric circuitry for an electrically operated aerosol generating device, causes the programmable electric circuitry to perform the method of claim 1.

* * * * *